(12) United States Patent
Offenbacher et al.

(10) Patent No.: US 11,604,157 B2
(45) Date of Patent: Mar. 14, 2023

(54) REFERENCE ELECTRODE FOR THE POTENTIOMETRIC MEASUREMENT OF ION CONCENTRATIONS

(71) Applicant: ERBA TECHNOLOGIES AUSTRIA GMBH, Graz (AT)

(72) Inventors: Helmut Offenbacher, Graz (AT); Werner Sallegger, Graz (AT); Stefan Köstler, Kainbach bei Graz (AT)

(73) Assignee: ERBA TECHNOLOGIES AUSTRIA GMBH, Graz (AT)

( * ) Notice: Subject to any disclaimer, the term of this patent is extended or adjusted under 35 U.S.C. 154(b) by 288 days.

(21) Appl. No.: 16/771,159

(22) PCT Filed: Dec. 20, 2018

(86) PCT No.: PCT/AT2018/000098
§ 371 (c)(1),
(2) Date: Jun. 9, 2020

(87) PCT Pub. No.: WO2019/118993
PCT Pub. Date: Jun. 27, 2019

(65) Prior Publication Data
US 2021/0172895 A1    Jun. 10, 2021

(30) Foreign Application Priority Data
Dec. 21, 2017 (AT) ................................. 498/2017

(51) Int. Cl.
*G01N 27/30* (2006.01)
*G01N 27/333* (2006.01)
*G01N 27/401* (2006.01)

(52) U.S. Cl.
CPC ....... *G01N 27/301* (2013.01); *G01N 27/3335* (2013.01); *G01N 27/401* (2013.01)

(58) Field of Classification Search
CPC . G01N 27/301; G01N 27/3335; G01N 27/401
See application file for complete search history.

(56) References Cited

U.S. PATENT DOCUMENTS

| 4,434,249 A | 2/1984 | Ballestrasse et al. |
|---|---|---|
| 6,419,809 B1 | 7/2002 | Suzuki et al. |

(Continued)

FOREIGN PATENT DOCUMENTS

| DE | 10214035 A1 | 10/2003 |
|---|---|---|
| DE | 102012102321 A1 | 9/2013 |

(Continued)

OTHER PUBLICATIONS

Online glossary entitled Electro-chemical Definitions on the Microchemical website—https://www.microchemicals.com/products/electroplating/electrochemical_definitions.html Downloaded Jun. 13, 2022. Publication date not known. (Year: 2022).*

(Continued)

*Primary Examiner* — Alexander S Noguerola
(74) *Attorney, Agent, or Firm* — Pillsbury Winthrop Shaw Pittman, LLP (57) ABSTRACT

In a reference electrode for the potentiometric measurement of ion concentrations, comprising a swellable polymer body filled with at least one electrolyte salt and a potential sensing element of the second type located in the polymer body, preferably of the Ag/AgCl type, the polymer body is composed of preferably organic, hydrophobic prepolymer segments, which are three-dimensionally crosslinked by preferably organic, hydrophilic polymer chains.

36 Claims, 8 Drawing Sheets

(56) References Cited

U.S. PATENT DOCUMENTS

| | | | | |
|---|---|---|---|---|
| 2003/0065024 | A1* | 4/2003 | Lambert | A61K 9/1075 514/449 |
| 2005/0196702 | A1* | 9/2005 | Bryant | G03F 7/20 430/311 |

FOREIGN PATENT DOCUMENTS

| | | | | |
|---|---|---|---|---|
| DE | 102015118581 A1 | | 5/2017 | |
| EP | 1124132 A1 | | 8/2001 | |
| EP | 1956368 A1 | | 8/2008 | |
| EP | 3101414 A1 | | 7/2016 | |
| KR | 10 0217882 B1 | * | 10/1998 | G01N 27/28 |
| WO | 2014/091083 A1 | | 6/2014 | |

OTHER PUBLICATIONS

English language translation of KR 10-0217882 B1 obtained from the Korean Intellectual Property Office website. Downloaded Jun. 13, 2022. Patent published on Oct. 15, 1998. (Year: 1998).*
Lee et al., "Ion-Sensitive Field-Effect Transistor for Biological Sensing," Sensors 2009, 9, 71111-7131; doi:10.3390/s90907111 (Year: 2009).*
Polyhydroxyethyl methacrylate entry on the polymerdatabase website—http://polymerdatabase.com/Polymer%20Brands/PHEMA.html Downloaded Jun. 14, 2022. publication date not know, so presumed 2022. (Year: 2022).*
Wen et al., "Enhancing the dehumidification performance of LiCl solution with surfactant PVP-K30," Energy & Buildings 171 (2018) 183-195 (Year: 2018).*
Arquint et al., Integrated blood-gas sensor for pO2, pCO2, and pH,"Sensors and Actuators B" 340-344(1993) (Year: 1993).*
Aronhime et al., "Poly(ether urethane) Oligomers as Poly(HEMA) Crosslinkers," Clinical Materials 15 (1994) 161-167 (Year: 1994).*
Arima et al., "The Effects of Cross-linking Agents on Some Properties of HEMA-based Resins," J. Dent. Res 74(9): 1597-1601, Sep. 1995 (Year: 1995).*
EPO computer-generated English language translation of EP1956368 A1, patenet published Aug. 13, 2008 (Year: 2008).*
EPO computer-generated English language translation of DE 10201202321 A1, patenet published Sep. 9, 2013 (Year: 2013).*
International Search Report dated Mar. 27, 2019 issued in corresponding International Patent Application No. PCT/AT2018/000098 with English translation (4 pgs.).
Written Opinion of the International Searching Authority dated Mar. 27, 2019 issued in corresponding International Patent Application No. PCT/AT2018/000098 (5 pgs.).

* cited by examiner

REFERENCE ELECTRODE FOR THE POTENTIOMETRIC MEASUREMENT OF ION CONCENTRATIONS

CROSS-REFERENCE TO RELATED APPLICATIONS

This application is a national stage entry of PCT/AT2018/000098, filed Dec. 20, 2018, which claims priority to Austrian Patent Application No. A 498/2017, filed Dec. 21, 2017, the entire contents of both of which are herein incorporated by reference in their entireties.

BACKGROUND

Field

The invention refers to a reference electrode for the potentiometric measurement of ion concentrations, comprising a swellable polymer body filled with at least one electrolyte salt and a potential sensing element of the second type or second kind, preferably of the Ag/AgCl type, located in the polymer body.

Description of Related Art

A specific active electrode and a reference electrode, which are in contact with a sample, are used for the potentiometric measurement of ion concentrations with the aid of ion-sensitive electrodes. According to known laws, the potential difference between the electrodes of such an electrode pair is representative of the ion concentration to be determined in the sample.

In the case of reference electrodes of the second type or second kind, a reference system is provided with a potential sensing element made of a metal, which is provided with a coating of its hardly soluble metal salt, the reference system being in contact with an electrolyte, the so-called internal electrolyte. Reference electrodes with a silver potential sensing element, which is provided with an AgCl coating, are widespread. KCl and/or NaCl is usually provided as the electrolyte salt. The electrochemical potential of an Ag/AgCl/KCl electrode depends on the temperature and the chloride ion activity. Provided that the electrolyte is saturated and thus the chloride ion activity is constant, the potential of the Ag/AgCl/KCl electrode is also constant at a defined temperature, so that such an electrode can be used as a reference electrode.

The properties of such reference electrodes are determined in particular by the loss rate of the electrolyte, which is caused by the leaching of the electrolyte upon contact with the sample. With such leaching of the electrolyte, potential fluctuations can occur at the reference electrode, which have a direct effect on the behavior of the working electrode and thus lead to measurement inaccuracies. Therefore, efforts are made to maintain a defined and constant chloride concentration in the electrolyte so that the reference electrode supplies a defined potential.

In order to obtain potential-stable reference electrodes, the inner electrolyte space is usually connected to the aqueous sample via an ion-permeable diaphragm. In order to keep the liquid junction potential occurring at the transition between the diaphragm and the sample medium as low as possible, i.e. to create defined conditions in the diaphragm area with regard to mixing the sample with the internal electrolyte, a permanent electrolyte salt flow is created which is maintained during the measurement, wherein the flow is directed through the diaphragm from the inner electrolyte space to the sample. KCl is preferably used as the chloride component because the permeabilities for potassium and chloride ions are approximately the same when they pass from the diaphragm into the sample, which leads to a minimization of the mixing potential.

Designs of reference electrodes in which the electrolyte solution is solidified by the addition of gel formers have already become known. Reference electrodes are also known in which the electrolyte salt is introduced into a polymer and, together with the solidified polymers, forms the structural core of a robust reference electrode, the function of which does not require an additional diaphragm (EP 247535 A2).

Solid-state reference electrodes have also become known which are particularly suitable for embodiments made in thick-film technology. With thick-film processes, miniaturized reference electrodes can be produced using only solid electrode components.

For solid-state reference electrodes in which the electrolyte salt is embedded in a polymer body, embodiments are also described in the literature in which an electrolyte salt reservoir is formed in the form of crystalline KCl which is mixed with polymers which swell to a greater or lesser extent in aqueous media. The KCl crystal suspension ensures a defined high chloride concentration in the polymer body. The problem, however, is that all alkali chlorides are so readily soluble in water that water is only available for sufficient swelling after the alkali chloride has completely dissolved. This fact is reflected in an extension of the so-called wet-up phase, which is the time it takes the polymer internal electrolyte to reach a constant potential of the reference electrode.

SUMMARY

The invention therefore aims to improve a reference electrode of the type mentioned at the outset, in which a swellable polymer body is filled with at least one electrolyte salt, in such a way that the wet-up phase can be shortened. The invention further aims to ensure improved adhesion properties of the reference electrode on polymer substrates, for example to achieve better adhesion to an inner electrolyte housing or, in the case of thick-film applications, better adhesion to the sensor substrate. In addition, the invention aims to provide a reference electrode with a long-term potential stability.

To achieve these objects, the invention, in a reference electrode of the type mentioned at the outset, essentially consists in that the polymer body is composed of preferably organic, hydrophobic prepolymer segments which are three-dimensionally crosslinked by means of preferably organic, hydrophilic polymer chains.

To achieve the stated objects, the invention further provides a method for producing a polymer body for use as a reference electrode, comprising the steps:
a) producing a mixture of preferably organic, hydrophobic prepolymer segments and preferably organic, hydrophilic and optionally hydrophobic monomers in order to obtain a prepolymer-monomer mixture,
b) adding a solution of at least one electrolyte salt to the prepolymer-monomer mixture,
c) mixing the electrolyte salt solution with the prepolymer-monomer mixture, wherein the at least one electrolyte salt partly precipitates in microcrystalline form and partly remains in the solution, d) polymerizing the monomers to give hydrophilic polymer chains which cross-link the prepolymer segments three-dimensionally, thereby obtaining the polymer body in which the at least one electrolyte salt is embedded.

According to the invention, a hydrophobic or nonpolar, preferably organic, prepolymer crosslinked by preferably organic, hydrophilic bridge elements is thus used in the reference electrode, which already before solidifying contains the water anticipated to swell as a saturated solution of the electrolyte salt, which has the consequence that the electrolyte-containing, cross-linked polymer has a greatly reduced wet-up phase and can be used immediately after aqueous equilibration of the transition layer between the polymer body and the sample liquid. Due to the degree of crosslinking and the added salt-water mixture, the swelling rate is preferably less than 5-20%. The salt flow caused by diffusive processes from the internal electrolyte to the sample is greatly minimized, which ensures the long potential stability, and is in the order of magnitude of the measuring current required for the potential measurement.

In the context of the present invention, organic polymers refer to macromolecules which are composed of monomer units which are typically classed as organic compounds. Such organic compounds are characterized in that their main structure is formed from carbon atoms, although they can also contain functional groups, most of which have heteroatoms, and the other free valences of the carbon atoms are saturated with hydrogen atoms. The most common functional groups containing heteroatoms in organic chemistry are, for example, alcohols, ethers, carbonyl compounds, amines, amides, thiols and sulfides. In contrast, in typical inorganic polymers the main chains are predominantly formed by elements other than carbon. These are, for example, silicon in polysilicic acids, silicates and polysiloxanes, phosphorus in polyphosphates, tin in polystannates, etc.

The advantageous, preferred use of organic, hydrophobic prepolymers for the production of the reference electrode gel as a three-dimensionally cross-linked composite material results, inter alia, from the good compatibility and miscibility of these polymers with the preferably organic hydrophilic monomers used. Above all, the preferred use according to the invention of hydrophobic, organic prepolymers and hydrophilic, organic monomers selected from chemically very similar groups of substances enables good compatibility and miscibility of the two polymer phases with one another for the processing of the formulations and the use of the composite material formed. This prevents undesired segregation effects when processing the material formulations before crosslinking, as well as the formation of macroscopic domains and phase separation of the polar or non-polar polymer phases in the finished crosslinked polymer electrolyte. The formation of only a few nm large, non-polar, hydrophobic phases in the composite material of the invention and their homogeneous distribution takes place through the use of macromolecular, hydrophobic, organic prepolymers as starting materials and not through a poor or limited miscibility of the starting materials.

The combination of the nanoscale hydrophobic domains formed from hydrophobic, organic prepolymers with the three-dimensional network formed by polymerization of predominantly hydrophilic, organic monomers, to form the composite material according to the invention, can take place either by physical (entangling, interpenetrating networks) or chemical (covalent bonds) Interactions.

In the course of mixing the electrolyte salt solution with the preferably organic, prepolymer-monomer mixture, a large part of the electrolyte salt precipitates out in a microcrystalline manner and the remaining water or the still dissolved electrolyte salt, after solidification with the 3D-crosslinked polymer, gives the internal electrolyte, in which the embedded microcrystalline electrolyte salt according to the law of mass action determines the ion concentration necessary for the stable potential.

Since, as this corresponds to a preferred embodiment, the 3D-crosslinked, hydrated, organic polymer body forms a molecular diaphragm for the at least one electrolyte salt towards a sample space surrounding the reference electrode, i.e. is present as a polymer body with hydrophobic domains a few nanometers in size, which are embedded in a network of hydrophilic bridging elements, the ion transfer at the interface to the sample medium is reduced to the bare minimum. In this microstructure, the ion diffusion from the polymer body into the solution is throttled, wherein the salt ion efflux from the internal electrolyte space resulting from the diffusion shall be in the range of the measuring current. Since the salt transfer into the sample solution to be measured is, for the reason mentioned, greatly reduced in comparison to an electrolyte boundary layer, as occurs in conventional KCl internal electrolyte sample transitions, the liquid junction potential portion is significantly reduced.

The good adhesion of the polymer body to a polymer substrate results from a hydrophobic-hydrophobic interaction between the hydrophobic prepolymer segments and the polymer substrate.

Reduced swelling in aqueous media and good adhesion to polymeric edge components is particularly important in thick-film applications for the mechanically stable bond between the inner electrolyte layer and a polymer substrate, as used in planar sensor technology.

According to a preferred embodiment of the invention it is provided that the at least one electrolyte salt is formed by KCl or NaCl or a mixture of KCl and NaCl and optionally additionally comprises a long-chain, quaternary ammonium chloride, such as methyltrioctylammonium chloride or methyltridodecylammonium chloride. KCl has proven to be particularly advantageous because of the low liquid junction potential. In the case of a mixture of KCl with NaCl, it has been shown in the production process according to the invention that the influence of the liquid junction potential can be reduced even further by increasing the proportion of KCl in the alkali chloride solution added to the reference electrode of the invention. Obviously, potassium chloride dissolves better in the hydrated hydrophilic polymer material than sodium chloride. While the former accumulates in the polymer body and thus dominates the ion efflux over the molecular diaphragm, the sodium chloride crystallizes more proportionally and thus forms the salt reservoir in the vicinity of the potential sensing element, in particular the silver/silver chloride potential sensing element. Long-chain quaternary ammonium chlorides (for example methyltrioctyl or methyltridodecyl ammonium chloride, including long-chain quaternary ammonium chlorides), which are added to the prepolymer-monomer mixture in addition to NaCl or dilute KCl solution, can also be used as the bottom body determining the chloride concentration. Since these quaternary ammonium salts are only partially water-soluble, the potential stability and thus the reference electrode service life can be extended over time. The use of quaternary ammonium salts only has the disadvantage that there is chloride sensitivity until the polymeric internal electrolyte space has completely swelled, i.e. that the reference electrode functions as a chloride electrode shortly after its use;

this effect weakens in the course of the hydration of the polymer body in the current bridge area and finally disappears.

Preferably, the at least one electrolyte salt, in particular alkali chloride, such as, e.g., KCl and/or NaCl, is present both in microcrystalline form and in aqueous solution. The presence of finely divided alkali chloride and a hydrate phase, which is in thermodynamic equilibrium with a saturated alkali chloride solution, ensures that the electrode system silver-silver chloride has a stable potential over long periods (several months), which stable potential is dependent only from the temperature.

With regard to the structure of the polymer body from hydrophobic prepolymer segments which are crosslinked by means of hydrophilic polymer chains, a preferred embodiment provides that the prepolymer segments comprise a vinyl group-bearing, preferably organic, hydrophobic prepolymer, in particular a vinyl group-bearing (meth)acrylate prepolymer.

The organic prepolymer preferably has an average molecular weight of 1,000 to 1,000,000 daltons, in particular 10,000 to 100,000 daltons.

The hydrophilic polymer chains are preferably formed from hydrophilic monomers and optionally hydrophobic monomers, the hydrophilic monomers being selected from the group comprising hydrophilic ether and hydroxyl group-bearing (meth)acrylates, such as, for example, hydroxyethyl methacrylate (HEMA), hydroxyethyl acrylate, hydroxypropyl(meth)acrylate, diethylene glycol di(meth)acrylate, polyethylene glycol di(meth)acrylate (in particular with a number of ethylene oxide sequences per molecule from 3 to 10,000), tetrahydrofurfuryl (meth) acrylate, acryloylmorpholine, polypropylene glycol di(meth)acrylates, polyethylene glycol mono(meth)acrylates and glycidyloxypropyl methacrylate, as well as methacrylic acid, acrylic acid, maleic anhydride, acrylamides and methacrylamides. A composition of a reference electrode gel of this type is listed below by way of example:

| | |
|---|---|
| PMMA/tetrahydrofurfuryl methacrylate copolymer | 38.0 |
| HEMA | 55.8 |
| KCl | 0.9 |
| $H_2O$ | 4.5 |
| 2,2-dimethoxy-2-phenylacetophenone | 0.8 |

The hydrophobic monomers are preferably selected from the group comprising methyl methacrylate, hexamethyldi (meth)acrylate, methacrylates, acrylates of the lower alcohols, such as propanol, isopropanol, butanol, isobutanol, tert. butanol, acrylates of pentanols and hexanols, diols and low to high molecular weight fatty alcohols.

(Meth)acrylate resins that can be used both as adhesives and as casting resins consist on the one hand of a vinyl-terminal (meth)acrylate prepolymer component, which is inherently completely non-polar, and of the monomer methyl methacrylate, which acts both as a solvent and as reaction component for the prepolymer. Mostly radical polymerization using an organic peroxide or a photoinitiator results in a 3D-crosslinked acrylic resin glass with high impact strength, optimal optical properties and optimal solvent resistance.

Another particularly preferred class of hydrophobic prepolymers are polyesters, especially unsaturated polyesters, which have double bonds in the main chain and are able to polymerize with vinyl groups. Unsaturated polyesters are understood to mean polycondensation products of organic dicarboxylic acids or their anhydrides with diols, wherein the dicarboxylic acids partly contain double bonds, that is to say are unsaturated and are suitable under suitable conditions for free-radical polymerization with vinyl monomers.

Examples of unsaturated polyesters preferred in the context of the present invention are, for example, polycondensates composed of different proportions of phthalic and maleic acids with ethylene glycols and/or propylene glycols.

The mesh size of the crosslinked polymer can be controlled on the one hand by the phthalic acid/maleic acid ratio and on the other hand by the monomer content. In order to obtain better flexibility of the non-polar prepolymer chains, the phthalic acid can preferably be replaced by terephthalic acid, isophthalic acid or by aliphatic dicarboxylic acids such as adipic or sebacic acid. Instead of propylene glycol or ethylene glycol, polypropylene glycol can also be used or some polyethylene glycol can be used for better compatibility of the prepolymers with the hydrophilic monomers.

Hydrophilic (meth)acrylates (such as hydroxyethyl methacrylate) can preferably be used as solvents for the hydrophobic polyester prepolymers and at the same time as hydrophilic monomers for the formation of gel electrolytes.

As already mentioned, the swelling and thus also the ion mobility in the resulting gel can be controlled via the monomers from the group of the oligoethylene glycol di(meth)acrylates (essentially the di(meth)acrylates of di-, tri and tetraethylene glycol) or polyethylene glycol di(meth)acrylates.

Further hydrophobic, organic prepolymers preferred according to the invention are, for example, polyvinyl chlorides and styrene-maleic anhydride copolymers. The functionalization of these hydrophobic prepolymers with polymerizable vinyl groups is furthermore particularly preferred, for example in accordance with the reactions given below.

In the context of the present invention, carboxy PVC, which is converted into an amino group-bearing PVC body at room temperature in THF by means of dixyclohexyl-carbodiimide and a suitable diamine, is particularly preferred as the vinyl group-bearing PVC prepolymer. This amino PVC is subsequently reacted with glycidyloxy propyl acrylate, which results in a vinyl group-bearing PVC prepolymer.

Prepolymers based on vinyl-functionalized styrene-maleic anhydride copolymer are furthermore preferred, which can be modified analogously via dicyclohexyl carbodiimide and a diamine and subsequently with glycidyloxypropyl acrylate to form a vinyl group-bearing prepolymer which is well compatible with many monomers.

If, with such an acrylic resin, the non-polar monomer (methyl methacrylate) is replaced with hydrophilic to water-miscible monomers, such as hydroxymethyl methacrylate (HEMA), hydroxypropyl methacrylate, diethylene glycol di(meth)acrylate, polyethylene glycol di(meth)acrylate, glycidyloxypropyl methacrylate and others, 3D-crosslinked polymer bodies are obtained in the course of the crosslinking reaction based on radical polymerization, which 3D-crosslinked polymer bodies have optimal adhesive properties to polymers but also to glass despite their swelling in aqueous systems. Adhesion to glass can be achieved on the one hand by adding small amounts of aminopropyltriethoxysilane in a polyacrylate formulation modified with more hydrophilic monomers or by pretreating glass with aqueous aminopropyltriethoxysilane solutions, in both cases producing an amino functionalization of the glass surface on which the epoxy group of the glycidyloxypropyl methacrylate binds covalently.

The polymer swelling can preferably be adjusted by the choice of the hydrophilic monomer components or the monomer mixture and/or by the weight ratio of the monomer to the hydrophobic prepolymer component. In particular, the degree of swelling is adjusted by selecting the weight ratio of hydrophilic monomers to hydrophobic monomers. A preferred embodiment of the invention provides here that the polymer body has a content of hydrophobic, organic prepolymer segments of 15 to 80% by weight, preferably between 25 to 70% by weight.

The prepolymer-monomer mixture preferably comprises 60-70% by weight of a vinyl group-bearing polymethyl methacrylate prepolymer and 30-40% by weight of methyl methacrylate. The methyl methacrylate can be substituted by hydrophilic (meth)acrylate esters by adding an amount of hydroxyethyl methacrylate or other hydrophilic monomers analogous to the methyl methacrylate content to the resin system and then pulling off the methyl methacrylate by means of a Rotavapor at 80 to 100° C. under vacuum (initially water jet vacuum, later oil pump vacuum). The resulting product is highly viscous and has a shelf life of well over 3 years in the refrigerator.

This product can be mixed with the methyl methacrylate-containing starting resin. In order to increase the hydrophilicity and also the swelling rate, the content of hydrophilic monomers can be increased by adding them.

Compared to linear hydrophilic polymers that can be obtained by in situ polymerization of a monomer cocktail of hydrophilic to hydrophobic monomers, the 3D crosslinked polymer bodies of the invention are homogeneous and show a significantly lower swelling in water or in aqueous electrolytes. A major advantage of the polymers according to the invention is that monomer cocktails, the individual components of which have a very different polarity or hydrophilicity, tend to form at least two mutually incompatible polymer phases in the course of the polymerization, which in particular causes inhomogeneous polymer bodies with regard to water absorption. If grafting hydrophilic polymer bridges onto a multiply vinyl-functionalized hydrophobic prepolymer coil, the effect of inhomogeneity due to the incompatibility is eliminated.

According to a preferred embodiment of the present invention, the polymer body contains hydrophilic polymer additives, in particular polyvinyl pyrrolidone (PVP), polyvinyl alcohol (PVA), polyethylene glycol (PEG), polyacrylamide, polyacrylic acid (PAA), and/or co-, graft-, and block copolymers of various hydrophilic polymers, preferably hydrophilic polymer additives, which are functionalized with polymerizable vinyl groups, the hydrophilic polymer additives preferably being present in the polymer body in an amount of 1-20% by weight.

Such hydrophilic polymer additives serve to improve hydration and increase the swellability of the reference electrode gel. Such hydrophilic polymer additives can preferably also be covalently incorporated as hydrophilic prepolymers into the reference electrode gel by functionalization with polymerizable vinyl groups. The functionalization of reactive end or side groups of the hydrophilic polymers (for example —OH, —COOH, —NH—, —NH2, —SH, etc.) can be carried out by reacting with conventional reagents to introduce polymerizable vinyl groups (such as glycidyl (meth)acrylate, (meth)acrylic anhydride, (meth)acryloyl chloride, etc.). A composition of a reference electrode gel of this type is listed below by way of example:

| | |
|---|---|
| PMMA resin prepolymer | 13.8 |
| Hydroxyethyl methacrylate | 75.5 |
| Acrylate-modified polyvinyl alcohol-polyethylene glycol graft copolymer | 4.5 |
| KCl | 0.9 |
| $H_2O$ | 4.5 |
| 2,2-dimethoxy-2-phenylacetophenone | 0.8 |

To avoid excessive shrinkage of the reference electrode gel during UV-induced or thermal curing and crosslinking reactions and to improve the hydration behavior, the invention can preferably be further developed such that the polymer body contains low molecular weight hydrophilic polymer additives with lower volatility than water, in particular glycerin, ethylene glycol, propylene glycol, di- or triethylene glycol, dimethyl sulfoxide, the low molecular weight hydrophilic polymer additives preferably being present in the polymer body in an amount of 1-10% by weight. Such additives are preferably selected from glycerol, ethylene glycol, propylene glycol, di- or triethylene glycol, dimethyl sulfoxide (DMSO), dimethylformamide, etc., and are co-solvents or low-molecular plasticizers for the hydrophilic polymer network and hydration aids. The use of these additives according to the invention is particularly advantageous when the reference electrode is designed in thick-film technologies, since a large part of the water present in the original formulation evaporates during the curing process. A composition of a reference electrode gel of this type is listed below by way of example:

| | |
|---|---|
| PMMA resin prepolymer | 13.7 |
| Hydroxyethyl methacrylate | 75.3 |
| fumed silica | 5.1 |
| NaCl | 1.0 |
| $H_2O$ | 1.8 |
| Glycerol | 2.3 |
| 2,2-dimethoxy-2-phenylacetophenone | 0.8 |

Since, for example, in the course of the UV-induced polymerization of gels applied in thick-film processes, the water which has been introduced with the sodium chloride and which already anticipates part of the swelling evaporates, it is advantageous to add additives such as glycerol, ethylene or propylene glycol to the mixture. Ethylene glycols and glycerol are therefore very cheap because they have polarities similar to water and—under the curing conditions usually present—low volatility. In addition, however, ethylene glycol can partially evaporate from the hardened composite after hardening, when stored for longer periods. Cavities can be created in the polymer network, which are advantageous in the hydration and swelling phase in the course of contacting the reference electrode with the measurement medium.

By adding low molecular weight hydrophilic substances, such as glycerol, diethylene to polyethylene glycol, the network formed in the course of the polymerization can be expanded, which results in increased water absorption. Polyethylene glycol di(meth)acrylate requires the introduction of large cross-linking segments with a strongly hydrophilic character. If a photoinitiated polymerization at room temperature is selected as the crosslinking reaction, the swelling can be anticipated by adding a few percent of water or an aqueous electrolyte solution.

The addition of functional (meth)acrylate monomers, in particular monomers bearing amino groups or tetraalkylammonium groups, can be used in the polymer body to stabilize the chloride concentration (formation of a further chloride reservoir).

According to a preferred embodiment of the invention, the hydrophilic polymer chains are additionally formed from monomers bearing quaternary ammonium groups, in particular from trialkyl(meth)acryloylalkylammonium chloride, in particular triethyl(meth)acryloylethylammonium chloride, from aminoalkyl(meth)acrylates, in particular dimethylaminoethyl(meth)acrylate, and from their hydrochlorides. This causes the presence of an additional chloride reservoir.

Further, it can preferably be provided that the hydrophilic polymer chains are additionally formed from multi-terminally thiol-modified chain-shaped compounds of variable polarity, such as polyoxyethylene dithiols or polyoxypropylene dithiols, which preferably photopolymerize with the vinyl groups of the prepolymer via the THIOL-ENE-CLICK reaction. This is an additional method of creating long-chain, hydrophilic bridging segments, as can also be achieved by copolymerization with polyethylene glycol di(meth)acrylates. This crosslinking with higher molecular weight hydrophilic bridging agents achieves a coarse mesh in the polymer composite and thus a possibility of modulating the ion mobility in the hydrophilic polymer.

The polymer body preferably further contains methacryloylalkoxysilyl compounds, such as trialkoxysilylalkenyl (meth)acrylates. This causes the polymer body to be covalently bound to a silicate or oxidic substrate (e.g. glass surface or glass tube surface). Partial hydrolysis of the alkoxy groups of the trialkoxysilyl-bearing monomer component on the surface subsequently leads to condensation with the silanol or hydroxyl groups of the oxidic (for example glass) interface and thus to a (meth)acryloyl functionalization of the surface. These (meth)acryloyl groups crosslink with the terminal radical functions of the growing polymer chains generated in the course of the polymerization.

Particularly preferred, it is provided that the polymer body is applied to a carrier in thick-film technology, in particular in a layer thickness of 10-100 μm. In this context, the silver/silver chloride electrode is preferably arranged in such a way that it is covered by the polymer body over a longer distance and the polymer body layer forms a current bridge with a layer thickness of approximately 10 to 50 μm towards the sample opening on the reference side, the ratio of the current bridge volume to the sample opening area being 100 to 500, preferably 200. This ensures that there is a constant salt concentration gradient between the sample opening of the polymer body and the Ag/AgCl potential sensing element, which on the one hand results from excess NaCl in the polymer body above the silver/silver chloride potential sensing element and on the other hand from the mean electrolyte concentration the sample media.

In order to promote the application of the polymer body layer by means of screen printing, it is preferably provided that the polymer body contains inorganic fillers, such as silicates or inert oxides, the fillers preferably being present in the polymer body in an amount of 30-70% by weight.

Alternatively, the polymer body together with the potential sensing element may be arranged in a tubular hollow mould which has an opening, wherein the polymer forms a window being sized 0.1 to 10 mm$^2$, preferably 0.5 to 5 mm$^2$, towards a sample.

When using hydrophobic polymer phases, micro/nanoporous polymer membranes as well as tightly cross-linked hydrophilic-hydrophobic nanocomposites as diaphragms for sample contact, undesirable potential formation depending on the ion composition of the sample solution can occur at the transition from the diaphragm to the sample medium. Such non-specific ion selectivities contradict the requirement of a sample-independent reference potential of the reference electrode and therefore impair precise potentiometric measurements. Possible causes for these additional potentials dependent on the ion composition are, for example, the formation of electrochemical double layer potentials at hydrophobic polymer interfaces or a selective hindrance to free ion exchange by nanoporous structures, electrical surface charges or the so-called Donnan potentials. This undesirable potential formation can be reduced by designing the so-called diaphragm area or current bridge area in the form of a very hydrophilic, wide-meshed polymer gel. The invention is therefore preferably further developed such that the polymer body, in the region diaphragm, is formed from a polymer electrolyte gel with increased hydrophilicity. This largely avoids selective interaction with a ion type and the consequent restriction of mobility. At the same time, however, the total ion flow due to diffusion is kept correspondingly low by the gel-like structure. While in the main part of the polymer gel electrolyte surrounding the silver/silver chloride electrode essentially the chloride ion concentration is to be kept largely constant, the transition to the current bridge area can be made so hydrophilic that non-specific, ion-dependent interference potentials are minimized. In a particularly advantageous embodiment according to the invention, this is done either by applying a coating of a clearly hydrophilic polymer gel to the current bridge area of the reference electrode gel (e.g. by dispensing or drop-coating) or by forming the last segment of the polymer gel in the current bridge area by the more hydrophilic polymer gel (e.g. by means of screen printing). In the polymer composite materials according to the invention, the increase in the hydrophilicity and the reduction in the crosslinking density can be achieved, for example, by increasing the proportion of the hydrophilic monomer (for example HEMA). Furthermore, comparatively low molecular weight, multifunctional monomers (e.g. triethylene glycol diacrylate) can increasingly be replaced by high molecular weight, hydrophilic macromonomers (e.g. polyethylene glycol diacrylate). In any case, the formation of the polymer electrolyte gel with increased hydrophilicity in the area of the diaphragm means that in this area the hydrophilicity is increased in comparison to the rest of the polymer electrolyte gel.

As already mentioned, the polymer body according to the invention can be produced using a method comprising the steps:

a) producing a mixture of preferably organic, hydrophobic prepolymer segments and preferably organic, hydrophilic and optionally hydrophobic monomers in order to obtain a prepolymer-monomer mixture,
b) adding a solution of at least one electrolyte salt to the prepolymer-monomer mixture,
c) mixing the electrolyte salt solution with the prepolymer-monomer mixture, wherein the at least one electrolyte salt partly precipitates in microcrystalline form and partly remains in the solution,
d) polymerizing the monomers to give hydrophilic polymer chains which cross-link the prepolymer segments three-dimensionally, thereby obtaining the polymer body in which the at least one electrolyte salt is embedded.

Preferably, an electrolyte salt solution with a saturation of 2-100%, preferably 10-100%, is used in step b).

Preferably, the electrolyte salt solution is added in an amount of 5-25 wt.-%, preferably 5-10 wt.-%, based on the prepolymer-monomer mixture.

Further, it is preferably provided that the polymerization in step d) takes place by means of a UV initiator, preferably selected from the group of benzoin ethers or substituted acetophenones, such as 2,2-dimethoxy-2phenyl-acetophenone (benzyl dimethyl ketal).

To facilitate the application of a layer of the polymer body by thick-film technology, in step c) further mixing with at least one inorganic filler, such as with silicates or inert oxides, may take place, wherein the at least one filler is preferably in an amount of 30-70% by weight based on the total amount. Preferably, the mixture of the electrolyte salt solution with the prepolymer-monomer mixture obtained in step c) is applied to a carrier in the form of a layer by means of screen printing over a potential sensing element and then step d) is performed to obtain a polymer body layer. Further, it is preferably proceeded such that an insulating layer, in particular a UV-curing insulating lacquer layer, is applied to the polymer body layer, wherein the insulating layer comprises a clearance that functions as a diaphragm window, via which a sample can contact the polymer body layer, wherein the potential sensing element is preferably arranged at a distance of >1 mm, preferably about 3 millimeters from the diaphragm window.

According to a preferred embodiment of the present invention the polymer body, in the region of the clearance functioning as a diaphragm window, is formed from a polymer electrolyte gel with increased hydrophilicity. The associated advantages have already been explained above.

Usually, thermally or UV-curing epoxy resins or special (meth)acrylate resins such as solder resists are used as dielectric insulating layers for electrochemical sensors in thick-film technology, which, in addition to good electrical insulation properties, also have excellent barrier properties against moisture, ion migration and water vapor. In the area of the reference electrodes of the invention, however, this good barrier effect against water vapor may be disadvantageous since it extends the hydration and swelling phase of the polymer gels of the invention and thus the time until a stable reference potential is present. In contrast, it is advantageous for a rapid adjustment of stable reference potentials to use a cover layer/cover membrane which is well permeable to water vapor and which nevertheless has good dielectric/insulating properties. According to a preferred embodiment of the present invention, the insulating layer is thus formed from a water vapor-permeable material, preferably selected from the group consisting of silicones, (meth)acrylate resins, in particular UV-curing (meth)acrylate resins, preferably containing fluoroalkane and/or siloxane chains. Particularly preferred are polymers with very high water vapor permeability such as especially fluoropolymers and silicones (polysiloxanes), e.g. as moisture-curing (oxime-splitting) one-component systems (e.g. Delogum CR3010) or as 2-component formulations crosslinking using a platinum catalyst (e.g. Dow-Corning Sylgard 184 or Wacker Elastosil RT 601). Also particularly preferred in this context are thermally or UV-crosslinking acrylate or methacrylate systems with optimized water vapor permeability that can be adjusted by the crosslinking density and/or the choice of the starting composition. The use of crosslinking (meth)acrylate-based cover membranes allows a particularly good connection with the underlying polymer gels. On the one hand, this is due to the similar chemical structure and, in particular, to the possibility of setting a certain residual content of still uncrosslinked (meth)acrylate groups in the areas of the polymer gel close to the surface (by regulating the radiation dose and or inhibiting oxygen in the reaction near the surface). These remaining (meth)acrylate groups on the surface of the polymer gel can crosslink further in the course of the crosslinking of the subsequently applied cover membrane and lead to a covalent bond between the polymer gel and cover membrane. To set an increased water vapor permeability of (meth)acrylate-based cover membranes, it is possible in particular to use acrylate or methacrylate resins which contain fluoroalkyl chains or siloxane chains. Examples of fluoroalkyl-functional acrylic resins are, for example, polymers containing perfluoroalkyl (meth)acrylates, or PTFE-urethane (meth)acrylates such as the material classes Solvay Fluorolink AD 1700 and MD 700. Examples of acrylic resins containing siloxane chains would be, for example, BYK UV-3500 or BYK UV-3570 as polyether-modified or polyester-modified, acrylic-functional polydimethylsiloxanes or Ebecryl 1360 or Ebecryl 350 as silicone acrylates.

BRIEF DESCRIPTION OF THE DRAWINGS

The invention is explained in more detail below on the basis of exemplary embodiments schematically illustrated in the drawing.

DETAILED DESCRIPTION OF EMBODIMENTS

Figure 1:
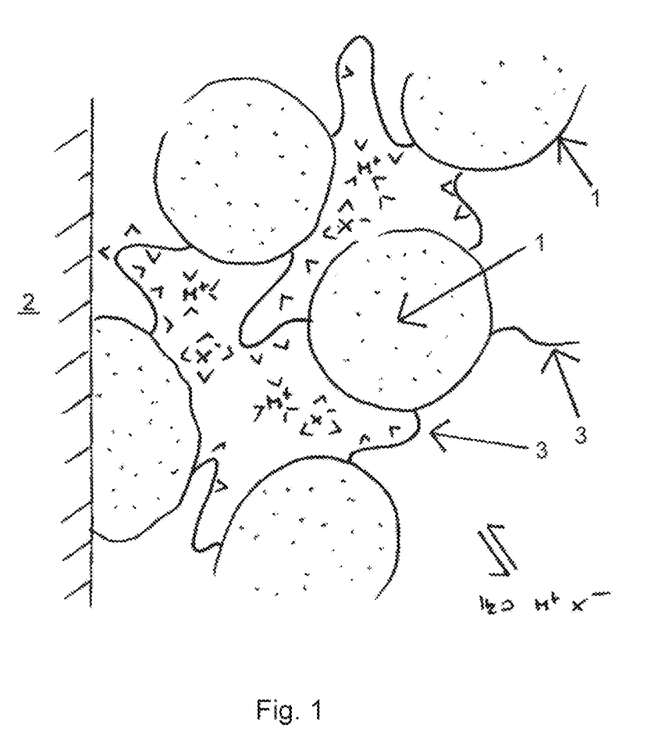
FIG. 1 shows an enlarged schematic illustration of a polymer body of the reference electrode according to the invention.

FIG. 1 shows the polymer body according to the invention. The nonpolar, hydrophobic prepolymer segments 1 in the form of coils are marked as circles. The prepolymer segments adhere to non-polar or weakly polar surfaces 2 by means of a hydrophobic-hydrophobic interaction. The prepolymer segments 1 are cross-linked to one another via hydrophilic polymer sequences 3 forming chains and networks. Between these there are water of hydration, free water and the ions of the alkali chlorides of the electrolyte salt, where "M(+)" denotes salt cations, "X(−)" salt anions and ">" water molecules.

Figure 2:
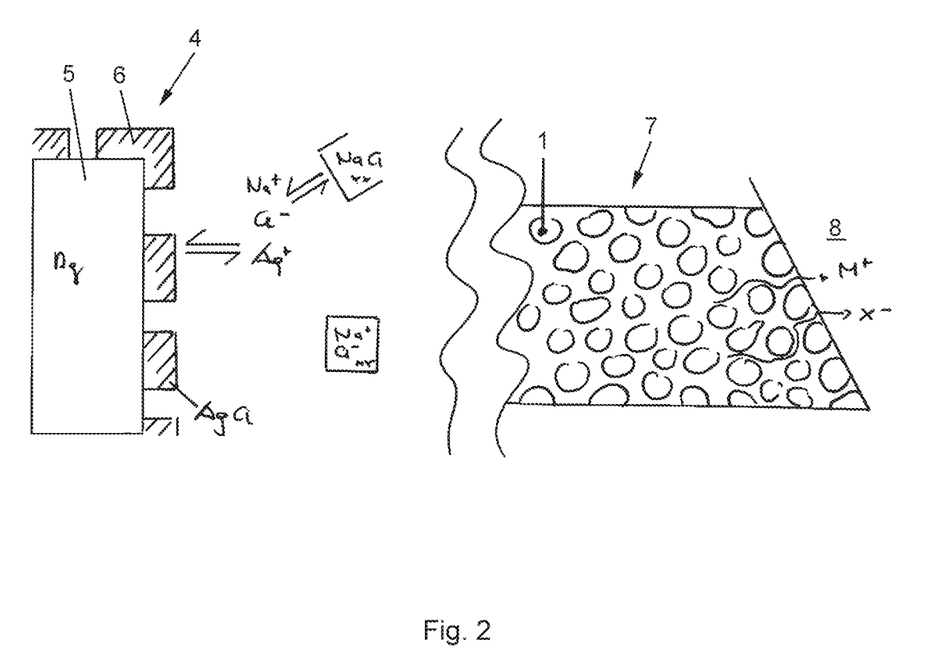
FIG. 2 shows a schematic illustration of the processes in the reference electrode according to the invention in the area of the potential sensing element and in the sample contact area.

In FIG. 2, the operation of the alkali metal chloride crystals near the surface of the silver/silver chloride potential sensing element is shown schematically in the left part. The potential sensing element 4 consists of a silver core 5, which is provided with a silver chloride coating 6. The ambient environment of the salt crystals thus results in a defined chloride activity on the potential sensing element 4 and thus also the resulting constant silver/silver(I) potential.

The right part of FIG. 2 shows the transition between the polymer body 7 and the sample liquid 8 with the hydrophobic prepolymer domains 1 which restrict the salt ion diffusion.

The invention is further illustrated below with the aid of exemplary embodiments for producing the reference electrode.

Example 1

This example relates to a pH sensor in a two-stick measuring chain in combination with an Ag/AgCl reference electrode, the cylindrical polymer body of which is arranged in a glass tube.

Production of the Polymer Body:

10 parts by weight of acrylic resin with 35% by weight of hydroxy methyl acrylate were mixed with 2.5 parts by weight of hydroxyethyl methacrylate and mixed with 7% by weight of saturated sodium chloride solution while stirring. The turbidity that occurs is caused by the NaCl precipitation in the mixture. Finally, 0.2 part by weight of the photoinitiator 2,2-dimethoxy-2-acetophenone was added. After preparation, the mixture had the following composition:

| | |
|---|---|
| PMMA resin prepolymer | 47.8 |
| Hydroxyethyl methacrylate | 44.2 |
| NaCl | 2.4 |
| $H_2O$ | 4.1 |
| 2,2-dimethoxy-2-phenylacetophenone | 1.5 |

This mixture was filled into a glass tube 9 tapering towards the sample space (FIG. 3—length: 3 cm, diameter: 3 mm, diameter at the taper: 2 mm), the tapered opening 11 having been closed with a parafilm film (an expandable, whitish translucent sealing film, made of about 50:50 paraffin wax and polyolefin) in order to prevent the mixture from flowing out. After placing an electrochemically one-sided chlorinated silver rod serving as a potential sensing element 5 in the central part of the tube 9 (the distance from the lower end of the chlorinated silver rod 5 to the sample opening was approx. 0.5-0.7 cm), the tube content was LW-UV-light cured (LW-UV, 2000 watts, 60 sec).

Figure 3:
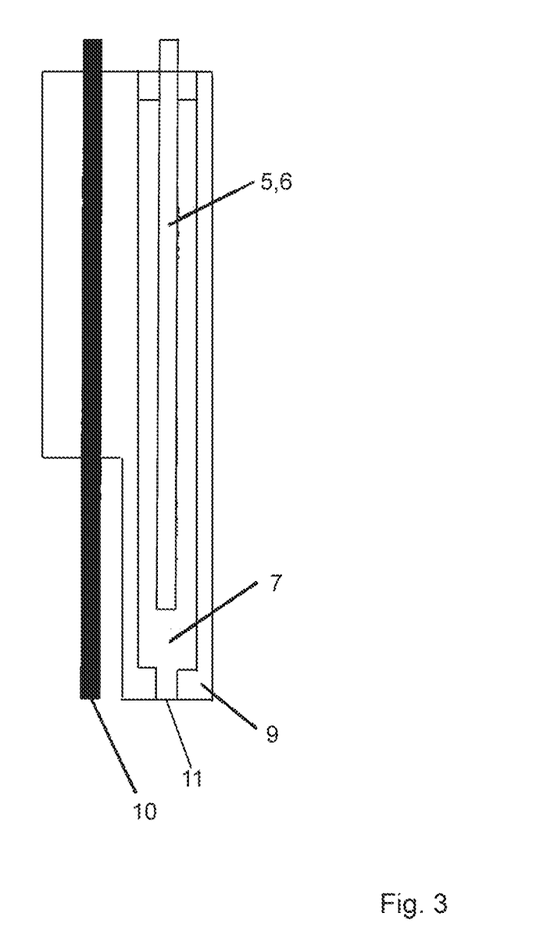
FIG. 3 shows a pH stick electrode with a reference electrode arrangement according to the invention.

The reference electrode obtained in this way was closed against the potential sensing and bound to a pH glass electrode 10. After swelling in a pH7-Sorensen buffer with 0.1 mol/1 NaCl background, i.e. after swelling and stabilization of the reference electrode potential, the following tests were carried out over a period of 12 months.

Measuring Arrangements:

A.) pH function graphs depending on the NaCl content of salted Sorensen buffers (basis=m/15 prim/sec. phosphate) measured values against the pH values of the test solutions determined with a combination electrode from WTW. The shift in the pH measurement functions, which is influenced by the salinity, provides information about the mixing potential resulting from the combination electrode.

B.) Measurement of the reference potential position against a silver-silver chloride reference electrode separated by a current bridge with a 1.0 molar KCl internal electrolyte. Monitoring the potential difference between the two electrodes over a period of 7 months.

Figure 4:
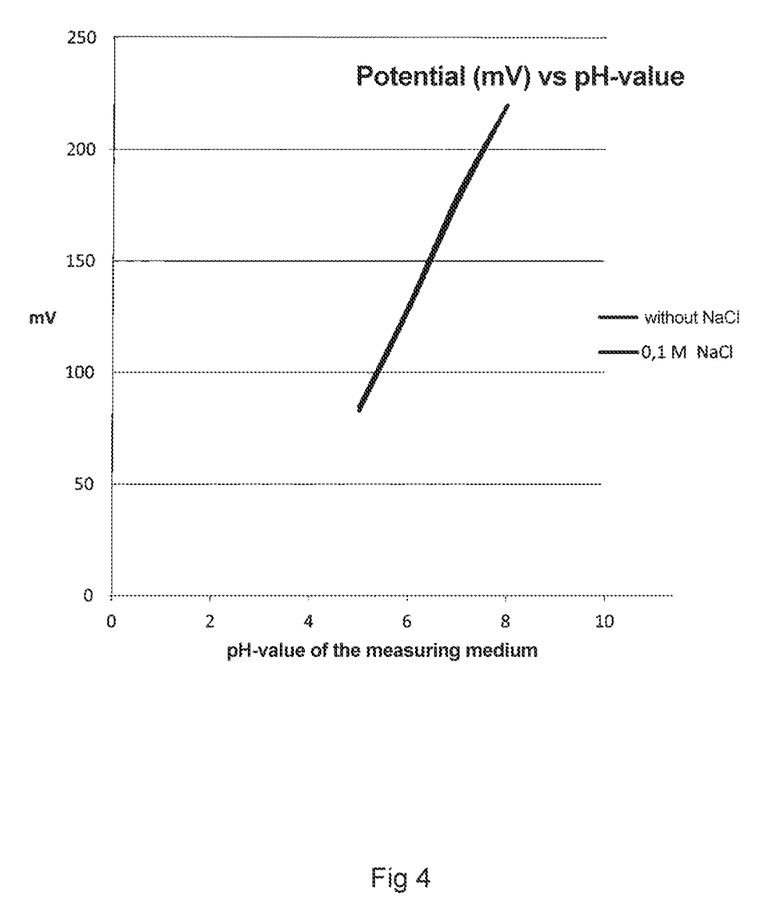
FIG. 4 shows the course of the potential of a pH-electrode with an inventive reference electrode over time.

Results:

The investigations have shown that when the 1/15 mol/l Sörensen buffer is salted, the pH curve in the range between pH5 and ph6 shifts by a maximum of 0.02 pH units, between pH6 and pH7 shifts by a maximum of 0.06 and at pH8 by +/−0.0 pH units shifted to higher pH values (see FIG. 4, which shows the potential curve of a pH electrode with a reference electrode of the invention in two measuring media: Sorensen buffer (m/15 prim/sec·P) once without and once plus 0.1M NaCl). FIG. 4 shows the following values:

| pH | without NaCl [mV] | 0 .1M NaCl [mV] |
|---|---|---|
| 5 | 85 | 83 |
| 6 | 130 | 128 |
| 7 | 180 | 177 |
| 8 | 220 | 220 |

Figure 5:
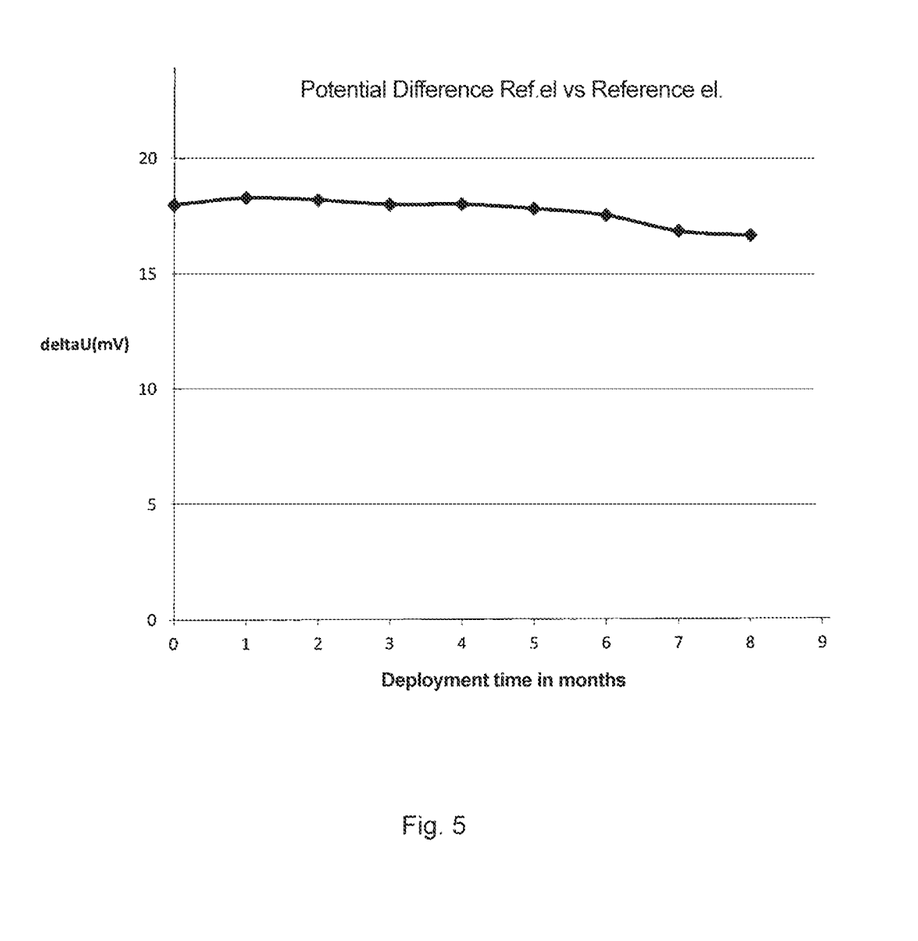
FIG. 5 shows the course of the potential difference in an arrangement according to FIG. 3 over time using an Ag/AgCl reference electrode with 1M KCl electrolyte.

The long-term measurements have shown that the initial potential difference between the reference electrode of the invention in the formulation defined above and an external reference electrode with 1 molar KCl solution as internal electrolyte changes from 18.0+/−0.3 mV to 17.5+/−0.3 mV after 6 months of use and changed to 16.5+/−0.3 mV after almost 8 months (see FIG. 5). After a year of running, the potential difference is reduced to 14-15 mV.

Example 2

This example concerns a thick-film pH sensor including a reference electrode system in a thick-film version.

Figure 6:
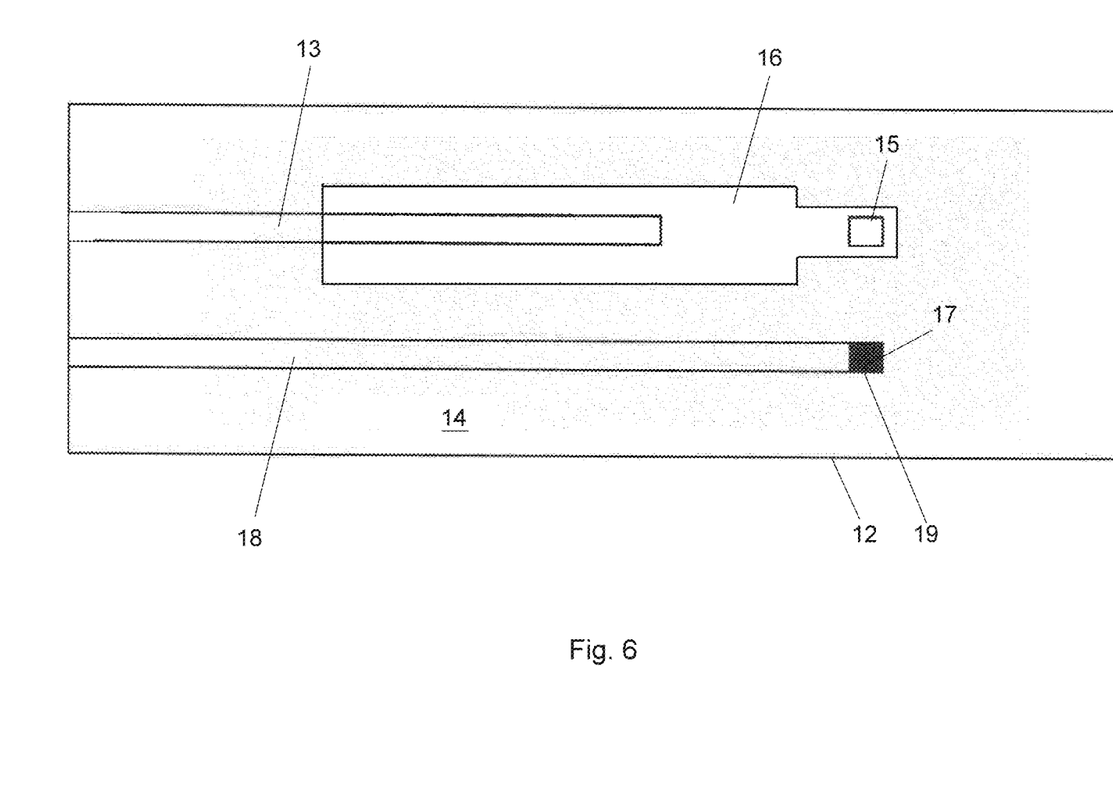
FIG. 6 shows a schematic representation of a thick-film sensor with ISE membrane spot and a reference electrode according to the invention and FIGS. 7 to 9 are sectional views of reference electrode arrangements according to the invention.

Construction:

An approximately 1 millimeter wide and several centimeters long silver-silver chloride path 13 screen-printed on a polymer carrier 12 acted as the base sensor on the reference electrode side. According to FIG. 6, a 3D cross-linkable prepolymer-hydrophilic monomer salt formulation 16 of the invention having the following composition, covering the silver-silver chloride path over about 2-3 centimeters, was applied.

Formulation: 10 parts by weight of acrylate-prepolymer-HEMA mixture (7:3) were mixed with a further 10 parts by weight of HEMA and 10 parts by weight of a microcrystalline aluminosilicate, 1 part of saturated sodium chloride solution and 0.4 part of an analog photoinitiator.

After preparation, the mixture had the following composition:

| | |
|---|---|
| PMMA resin prepolymer | 16.1 |
| Hydroxyethyl methacrylate | 30.0 |
| Aluminosilicate | 30.0 |
| NaCl | 8.3 |
| $H_2O$ | 14.7 |
| 2,2-dimethoxy-2-phenylacetophenone | 0.9 |

After application of formulation 16 (FIG. 6), curing was carried out in LW-UV at 1000 watt lamp output and this layer composite was also overprinted with an insulating lacquer system 14 which cured under UV light, the structure of the insulating lacquer layer 14 being chosen such that an approximately 1×1 mm large window 15 or diaphragm 15 was positioned on the reference electrode intermediate layer so that a distance to the silver-silver chloride path 13 of more than 2 millimeters was realized. The reference electrode is ready for measurement after 2-3 hours of swelling of the resulting polymer body 16 in a physiological standby buffer system (see FIG. 6). Furthermore, the insulating lacquer layer 14 has, at least for each ion-selective electrode, a further window 19, adapted to the size and position of the ion-selective sensor layer 17. The ion-selective electrode, consisting of the ion-selective sensor layer 17 and the potential sensing element 18, is likewise applied to the polymer carrier 12 and, with the exception of the window 19 which is exposed, is covered by the insulating lacquer layer 14.

Measurements:

Measuring arrangement: pH value measurement when combining the thick-film reference electrode with the thick-film pH electrode 17; Sorensen buffers (1/15 mol/l phosphate buffer) were measured with and without salting with 0.1 or 0.2 mol/liter sodium chloride. Furthermore, the potential stability of the thick film reference electrode was checked over a period of 2 weeks.

Results:

The measurements have shown that in the pH range between 6.5 and 8.0 the pH function in the case of salts with 0.1 mol/liter is around 0.02 pH units and in the case of salts with 0.2 mol/liter NaCl shifts by 0.04-0.05 pH units.

The potential of the reference electrode remains stable for several weeks at about 15 mV compared to an external reference system once the wetup (swelling phase) is complete.

Example 3

This example relates to the synthesis of an unsaturated polyester and the formulation of a corresponding reference electrode gel.

0.675 mol (100.0 g) phthalic anhydride, 0.510 mol (50.0 g) maleic anhydride and 1.24 mol (94.0 g) propylene glycol (equivalence ratio alcohol-OH to carboxyl groups=1.05) are melted while stirring and addition of inert gas. The reaction is heated to 205-210° C. and the water formed is drawn off with a water separator. Residual water of reaction is then removed from the reaction mixture using toluene as an entrainer. After the desired acid number (less than 45, mainly less than 30 mg KOH for neutralizing 1 g reaction mixture) has been reached, the entrainer is removed from the batch. After cooling to below 130° C., the mixture is diluted with 122 g of hydroxyethyl methacrylate with vigorous stirring and cooled to below 40° C. as quickly as possible. This polymerizable mixture, consisting of 66% by weight polyester and 34% by weight hydroxyethyl methacrylate (HEMA), depending on the desired swelling behavior of the gel generated by UV light in the case shown, is mixed with HEMA, tetraethylene glycol diacrylate, sodium chloride solution and, in the case of a thick layer application, for screen printability, an inorganic filler and a photoinitiator based on benzoin ether and substituted acetophenones such as 2,2-dimethoxy-2-phenyl-acetophenone (0.5 to 2% by weight of the prepolymer-monomer mixture present).

Example 4

This example relates to a reference electrode gel formulation based on unsaturated polyester as a hydrophobic prepolymer and 3D crosslinking with hydrophilic monomers.

1.5 parts of the polyester-HEMA mixture described at the outset are mixed with 0.25 part of HEMA and 0.25 part of tetraethylene glycol diacrylate, 0.02 part of 2,2-dimethoxy-2-phenyl-acetophenone and 0.2 part of 1 molar sodium chloride solution and cured via UV light. The UV curing time (LW-UV light) is from a few seconds to a maximum of 2 minutes at 1000 to 2000 watts of power and using inert gas. The swelling rate of the polymer body generated by polymerization is about 10 to 15%.

Example 5

Figure 7:
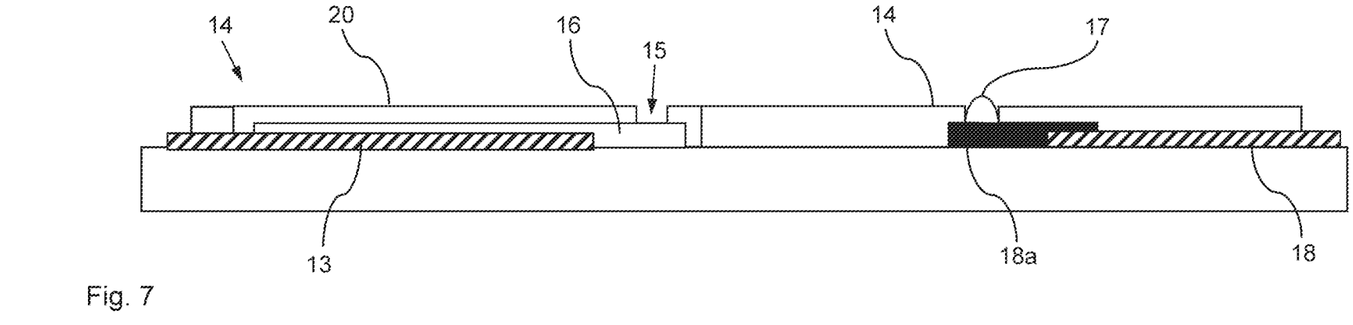
Figure 8:
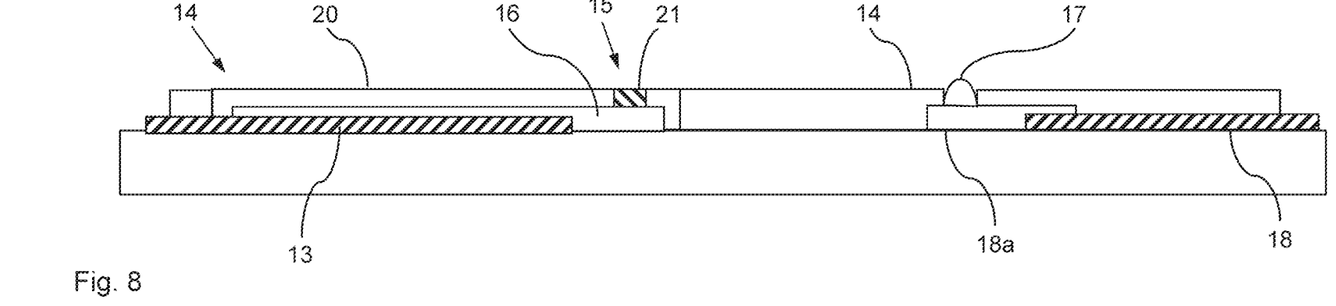
Figure 9:
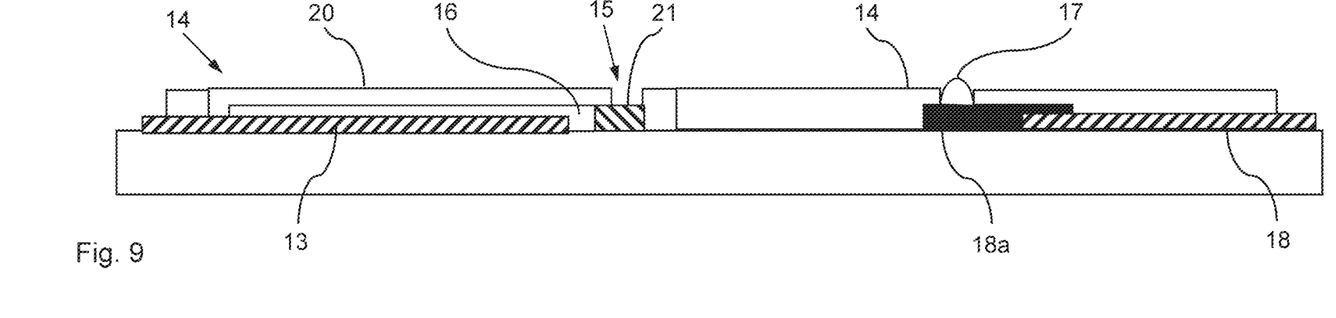

This example relates to a reference electrode according to the invention, in which the polymer body in the region of the diaphragm is formed from a polymer electrolyte gel with increased hydrophilicity 21 (FIGS. 7 and 8), that is to say in which the polymer body in the region of the diaphragm 15 is formed from a polymer electrolyte gel having an increased hydrophilicity when compared with the rest of the polymer body 16. At the same time, the insulating layer 14, in the area of the potential sensing electrode 13 or the potential sensing element 13, is formed from a water vapor-permeable material 20. Reference numeral 18a denotes a carbon solid contact.

10 parts by weight of PMMA prepolymer HEMA (production see above) are mixed with 20 to 25 parts by weight of hydroxyethyl methacrylate and 0.3 part by weight of photoinitiator. This mixture is applied via a microdispensing system, and hardening takes place in accordance with the previously defined specifications.

| Example of drop coating | |
|---|---|
| PMMA prepolymer | 14.4 |
| Hydroxyethyl methacrylate | 81.9 |
| Tetraethylene glycol dimethacrylate | 3.6 |
| 2,2-dimethoxy-2-phenylacetophenone | 0.1 |

Example 6

This example relates to a hydrophilic acrylate-based gel suitable for screen printing to coat the current bridge area:

10 parts by weight of PMMA prepolymer HEMA (preparation see above) with 20 parts by weight of hydroxyethyl methacrylate, 2.5 parts by weight of 1 molar sodium chloride solution and 2.5 parts by weight of pyrogenic silica and 0.3 part by weight of photoinitiator 2,2-dimethoxy-2-phenylacetophenone.

Example 7

Acceleration of the hydration and swelling phase of the reference electrode after contact with aqueous measuring medium when using a silicone-based cover layer when compared to a UV-hardened, acrylate-based cover layer.

Figure 10:
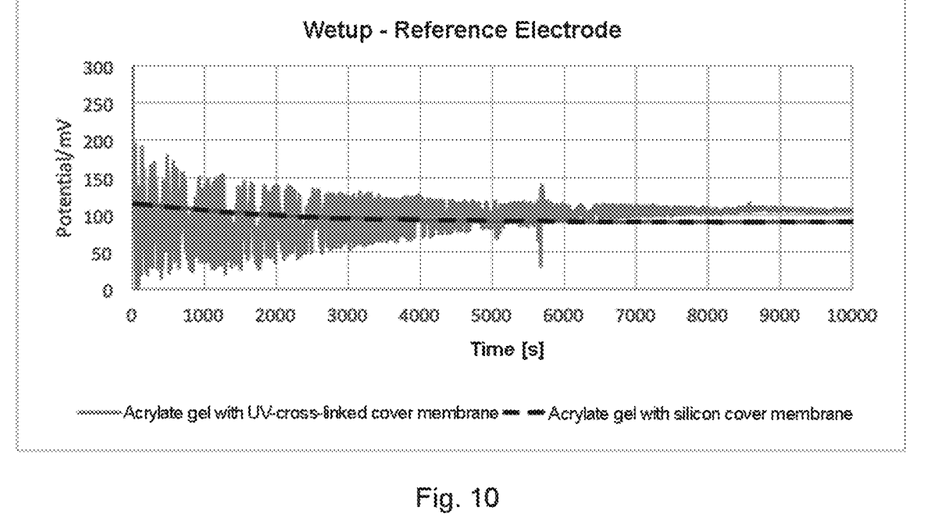
FIGS. 10 and 11 are diagrams for example 7.
Figure 11:
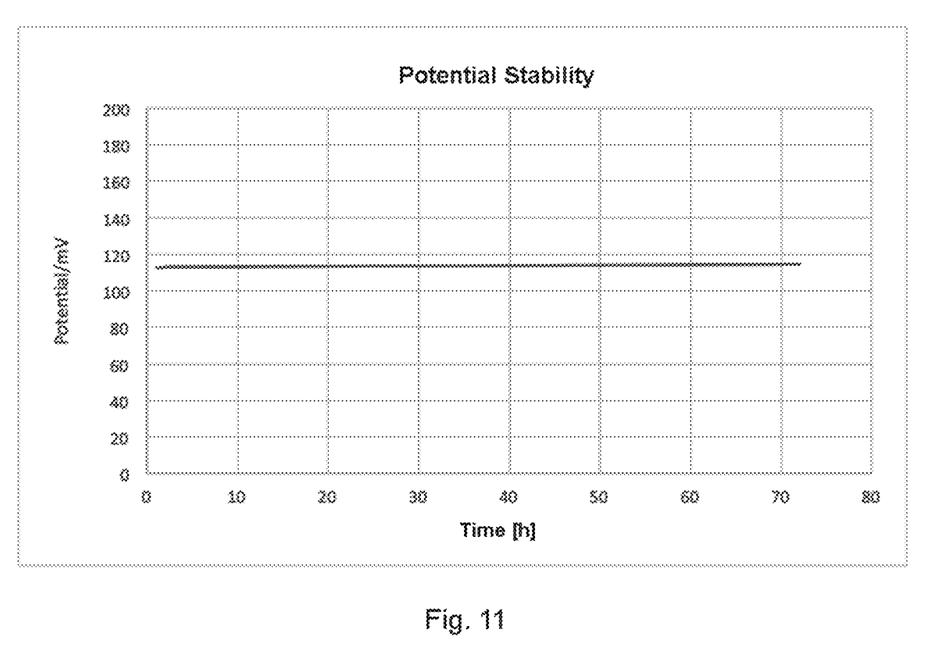

When UV-crosslinked acrylate resins are used as a cover membrane over the thick-film reference electrode, the inadequate hydration and swelling of the polymer gel and the resulting very high electrical internal resistance initially result in an unstable, highly noisy potential. The signal quality of these electrodes improves with increasing hydration and often only reaches a signal stability that is acceptable for potentiometric sensors after "wet-up periods" of up to 3 hours. In contrast, thick-film reference electrodes using highly water vapor-permeable silicone membranes over the polymer gel show smooth, low-noise signal profiles immediately after contacting with aqueous sample medium. This relationship is shown in FIG. 10. After hydration and swelling, these reference electrodes with water-vapor-permeable cover membranes also show very good potential behavior with regard to long-term stability. Typical values for the potential drift are here, for example, <1.5 mV over 70 h (see FIG. 11)

The invention claimed is:

1. A reference electrode for the potentiometric measurement of ion concentrations, comprising:
   a swellable polymer body filled with at least one electrolyte salt, and
   a potential sensing element of the second kind located in the polymer body,
   wherein the polymer body is composed of organic, hydrophobic prepolymer segments, which are three-dimensionally crosslinked by organic, hydrophilic polymer chains and
   wherein the at least one electrolyte salt is present both in microcrystalline form and in aqueous solution.

2. The reference electrode according to claim 1, wherein the polymer body forms a diaphragm for the at least one electrolyte salt to form a sample space surrounding the reference electrode.

3. The reference electrode according to claim 1, wherein the at least one electrolyte salt is formed by KCl or NaCl or a mixture of KCl and NaCl and additionally comprises a long-chain, quaternary ammonium chloride, methyltrioctylammonium chloride, or methyltridodecylammonium chloride.

4. The reference electrode according to claim 1, wherein the prepolymer segments comprise a vinyl group-bearing, organic, hydrophobic prepolymer.

5. The reference electrode according to claim 1, wherein the hydrophilic polymer chains are formed from hydrophilic monomers, the hydrophilic monomers being selected from the group consisting of: hydrophilic ether and hydroxyl group-bearing (meth)acrylates, hydroxyethyl methacrylate (HEMA), hydroxyethyl acrylate, hydroxypropyl(meth)acrylate, diethylene glycol di(meth)acrylate, polyethylene glycol di(meth)acrylate, tetrahydrofurfuryl (meth)acrylate, acryloylmorpholine, polypropylene glycol di(meth)acrylates, polyethylene glycol mono(meth)acrylates and glycidyloxypropyl methacrylate, methacrylic acid, acrylic acid, maleic anhydride, acrylamides and methacrylamides.

6. The reference electrode according to claim 5, wherein the hydrophilic polymer chains are formed from hydrophilic monomers and hydrophobic monomers.

7. The reference electrode according to claim 6, wherein the hydrophobic monomers are selected from the group consisting of: methyl methacrylate, hexamethyldi(meth)acrylate, methacrylates and acrylates of the lower alcohols, acrylates of pentanols, hexanols, and and low to high molecular weight fatty alcohols.

8. The reference electrode according to claim 7, wherein the hydrophobic monomers are acrylates of the lower alcohols selected from the group consisting of: propanol, isopropanol, butanol, isobutanol, and tert-butanol.

9. The reference electrode according to claim 5, wherein the hydrophilic polymer chains are formed from polyethylene glycol di(meth)acrylate with a number of ethylene oxide sequences per molecule from 3 to 10,000.

10. The reference electrode according to claim 1, wherein the polymer body has a content of hydrophobic, organic prepolymer segments of 15 to 80% by weight.

11. The reference electrode according to claim 10, wherein the polymer body has a content of hydrophobic, organic prepolymer segments of 25 to 70% by weight.

12. The reference electrode according to claim 1, wherein the polymer body contains hydrophilic polymer additives.

13. The reference electrode according to claim 12, wherein the hydrophilic polymer additives are selected from the group consisting of: polyvinyl pyrrolidone (PVP), polyvinyl alcohol (PVA), polyethylene glycol (PEG), polyacrylamide, polyacrylic acid (PAA), co-, graft-, and block copolymers of various hydrophilic polymers, and hydrophilic polymer additives which are functionalized with polymerizable vinyl groups.

14. The reference electrode according to claim 12, wherein the hydrophilic polymer additives are present in the polymer body in an amount of 1-20% by weight.

15. The reference electrode according to claim 1, wherein the polymer body contains low molecular weight hydrophilic polymer additives with lower volatility than water.

16. The reference electrode according to claim 15, wherein the low molecular weight hydrophilic polymer additives with lower volatility than water are selected from the group consisting of: glycerin, ethylene glycol, propylene glycol, di- or tri-ethylene glycol, and dimethyl sulfoxide.

17. The reference electrode according to claim 15, wherein the low molecular weight hydrophilic polymer additives with lower volatility than water are present in the polymer body in an amount of 1-10% by weight.

18. The reference electrode according to claim 1, wherein the hydrophilic polymer chains additionally comprise monomers bearing quaternary ammonium groups.

19. The reference electrode according to claim 18, wherein the monomers bearing quaternary ammonium groups are selected from the group consisting of: trialkyl(meth)acryloylalkylammonium chloride, triethyl(meth)acryloylethylammonium chloride, aminoalkyl(meth)acrylates, dimethylaminoethyl(meth)acrylate, and their hydrochlorides.

20. The reference electrode according to claim 1, wherein the hydrophilic polymer chains additionally comprise multi-terminally thiol-modified chain-shaped compounds of variable polarity, polyoxyethylene dithiols or polyoxypropylene dithiols.

21. The reference electrode according to claim 1, wherein the polymer body contains methacryloylalkoxysilyl compounds.

22. The reference electrode according to claim 1, wherein the polymer body is applied to a carrier in thick-film technology.

23. The reference electrode according to claim 1, wherein the polymer body contains inorganic fillers, the fillers being present in the polymer body in an amount of 30-70% by weight.

24. The reference electrode according to claim 1, wherein the polymer body together with the potential sensing element is arranged in a tubular hollow mould which has an opening, wherein the polymer body forms a window being sized 0.1 to 10 $mm^2$ or 0.5 to 5 $mm^2$ towards a sample.

25. The reference electrode according to claim 1, wherein the polymer body, in the region of a diaphragm, is formed from a polymer electrolyte gel with increased hydrophilicity as compared with a remaining part of the polymer body.

26. The reference electrode according to claim 1, wherein the potential sensing element is of the Ag/AgCl kind located in the polymer body.

27. A method for producing a polymer body for use for a reference electrode, comprising the steps:
   a) producing a mixture of organic, hydrophobic prepolymer segments and organic, hydrophilic and optionally hydrophobic monomers in order to obtain a prepolymer-monomer mixture,
   b) adding a solution of at least one electrolyte salt to the prepolymer-monomer mixture,
   c) mixing the electrolyte salt solution with the prepolymer-monomer mixture, wherein the at least one electrolyte salt partly precipitates in microcrystalline form and partly remains in the solution, d) polymerizing the monomers to give hydrophilic polymer chains which cross-link the prepolymer segments three-dimensionally, thereby obtaining the polymer body in which the at least one electrolyte salt is embedded.

28. The method according to claim 27, wherein an electrolyte salt solution with a saturation of 2-100% is used in step b).

29. The method according to claim 28, wherein the electrolyte salt solution has a saturation of 10-100% and is used in step b).

30. The method according to claim 27, wherein the electrolyte salt solution is added in an amount of 5-25 wt.-% based on the weight prepolymer-monomer mixture.

31. The method according to claim 30, wherein the electrolyte salt solution is added in an amount of 5-10 wt.-%.

32. The method according to claim 27, wherein in step c) further mixing with at least one inorganic filler takes place, wherein the at least one filler is present in an amount of 30-70% by weight based on the total amount of the polymer body.

33. The method according to claim 27, wherein a mixture of the electrolyte salt solution with the prepolymer-monomer mixture obtained in step c) is applied to a carrier in the form of a layer by means of screen printing over a potential sensing element and then step d) is performed to obtain a polymer body layer.

34. The method according to claim 33, wherein an insulating layer is applied to the polymer body layer, wherein the insulating layer comprises a clearance that functions as a diaphragm window, via which a sample can contact the polymer body layer.

35. The method according to claim 34, wherein the polymer body layer, in the region of the clearance functioning as a diaphragm window, is formed with increased hydrophilicity.

36. The method according to claim 34, wherein the applied insulating layer is formed from a water vapor-permeable material selected from the group consisting of: silicones, (meth)acrylate resins, and UV-curing (meth)acrylate resins.

* * * * *